United States Patent
Chen et al.

(10) Patent No.: US 9,683,542 B2
(45) Date of Patent: Jun. 20, 2017

(54) POWER GENERATING DEVICE UTILIZING OSCILLATING WATER FOR CONVERTING INTO WAVE POWER

(71) Applicant: Smart Energy Inc., Tainan (TW)

(72) Inventors: Shih-Hsiung Chen, Tainan (TW); Chun-Wei Mo, Tainan (TW)

(73) Assignee: SMART ENERGY INC., Tainan (TW)

( * ) Notice: Subject to any disclaimer, the term of this patent is extended or adjusted under 35 U.S.C. 154(b) by 427 days.

(21) Appl. No.: 14/287,022

(22) Filed: May 24, 2014

(65) Prior Publication Data

US 2014/0353974 A1    Dec. 4, 2014

Related U.S. Application Data

(63) Continuation-in-part of application No. 13/253,040, filed on Oct. 4, 2011, now abandoned.

(30) Foreign Application Priority Data

May 29, 2013  (TW) .............................. 102209979 U (51) Int. Cl.
    F16D 31/02       (2006.01)
    F03B 13/14       (2006.01)
    F03B 13/12       (2006.01)

(52) U.S. Cl.
    CPC ............ *F03B 13/142* (2013.01); *F03B 13/12* (2013.01); *Y02E 10/32* (2013.01); *Y02E 10/38* (2013.01)

(58) Field of Classification Search
    CPC ......... F03B 13/12; F03B 13/142; Y02E 10/32
    See application file for complete search history.

(56) References Cited

U.S. PATENT DOCUMENTS

| 4,539,485 A * | 9/1985 | Neuenschwander . F03B 13/187 290/53 |
| 2013/0081381 A1 * | 4/2013 | Chen ...................... F04B 19/04 60/325 |

FOREIGN PATENT DOCUMENTS

GB           1572086         7/1980

OTHER PUBLICATIONS

Office Action Dated May 28, 2014 of the Corresponding New Zealand Patent Application No. 625406.

* cited by examiner

*Primary Examiner* — Michael Leslie
(74) *Attorney, Agent, or Firm* — Chun-Ming Shih; HDLS IPR Services (57) ABSTRACT

A power generating device utilizing oscillating water for converting into wave power (1) includes: a power generating tank (10) formed with a first chamber (11), a second chamber (12) and a communicating hole (13); a quantitative liquid (20) filled in the first chamber (11) and the second chamber (12); a resonating member (30), having one end communicated with the first chamber (11) and the other end disposed in a wave (2); a quantitative gas (40) filled between the first chamber (11) and the resonating member (30); and a driving member (50, 50', 50'') pushed by the quantitative liquid (20). Accordingly, during the reciprocal movement of the wave (2), the quantitative gas (40) is pushed and squeezed thereby enabling the quantitative liquid (20) to push the driving member (50, 50', 50'') so as to generate power.

9 Claims, 11 Drawing Sheets

POWER GENERATING DEVICE UTILIZING OSCILLATING WATER FOR CONVERTING INTO WAVE POWER

RELATED BACKGROUND

This application is a continuation-in-part (CIP) application of U.S. patent application Ser. No. 13/253,040, filed on Oct. 4, 2011, now abandoned.

BACKGROUND OF THE INVENTION

Field of the Invention

The present invention relates to a power generating device, especially to a power generating device utilizing oscillating water for converting into wave power.

Description of Related Art

The crude oil reserve has been rapidly decreasing, and a renewable energy such as solar power, wind power, geothermal heat, ocean power, bioenergy and fuel cell having the advantages of clean, substantial, low carbon, and low pollution has been developed.

Among the above-mentioned renewable energies, because the ocean occupies more than two third of the earth, the enormous amount of ocean energy is available for being developed. The ocean power includes wave power, current power, tide power and thermal energy having the advantage of providing tremendous power, renewable and zero environmental pollution, wherein the wave power is the most preferable renewable energy. A coastal country is provided with the excellent natural wave power, and with the installation of a suitable wave power generator, a wave power generating station can be built for providing electric power.

Figure 1:
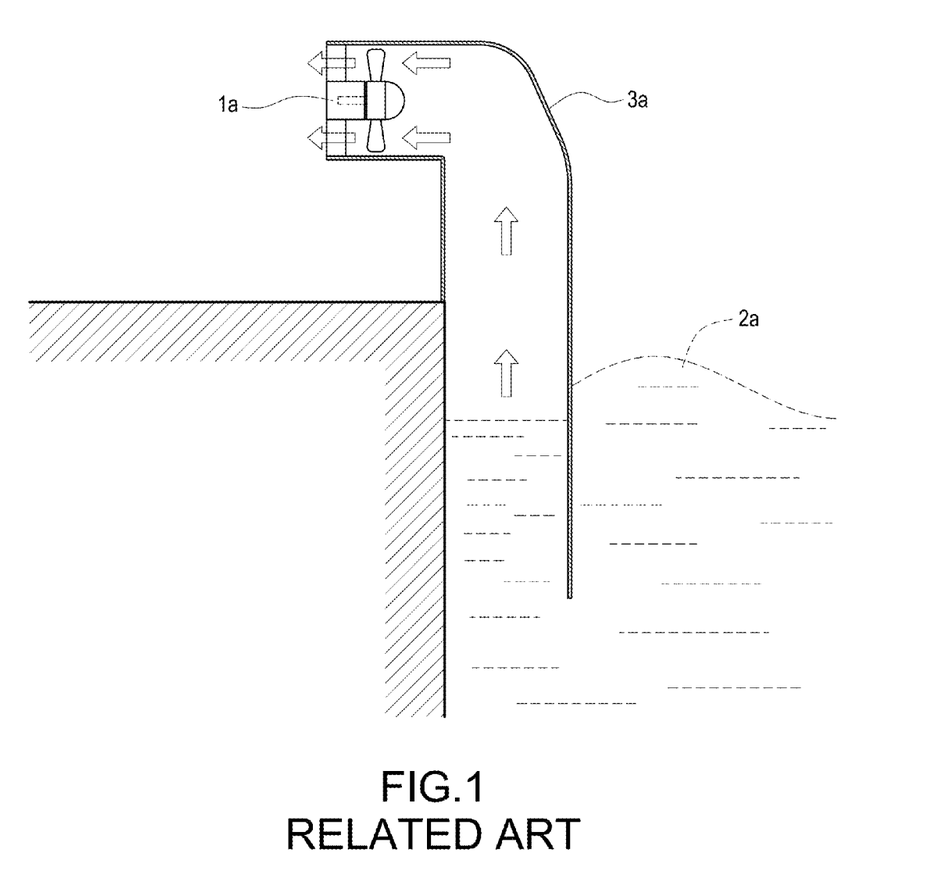
FIG. 1 is a schematic view illustrating a conventional wave power generator.
Figure 2:
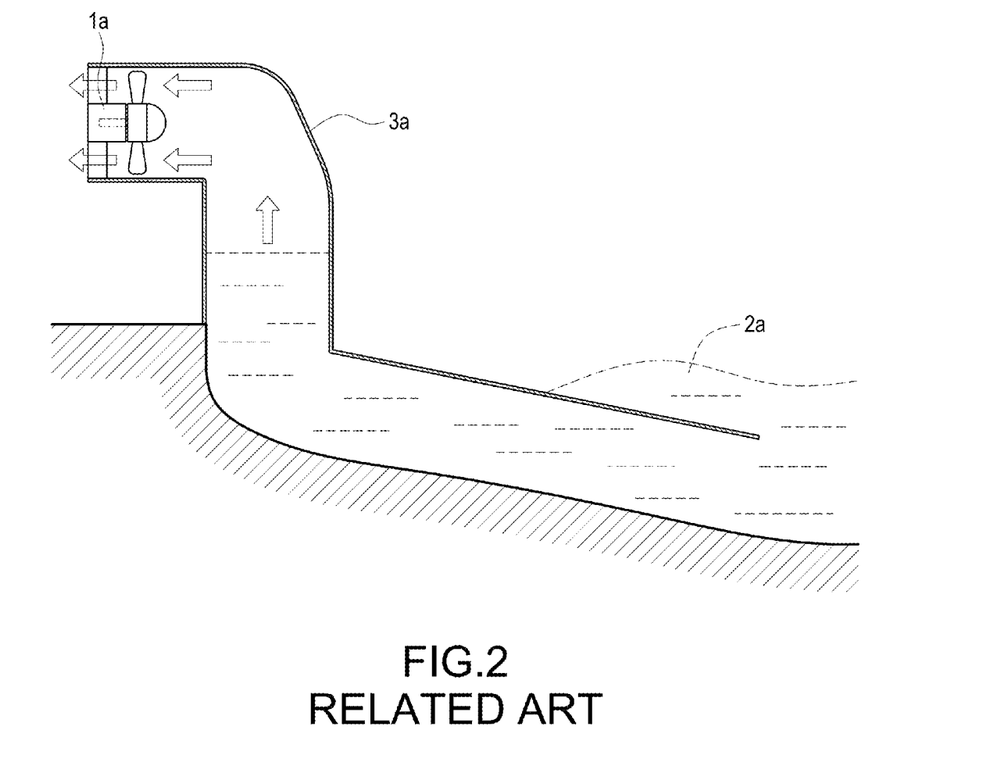
FIG. 2 is another schematic view illustrating the conventional wave power generator.

Please refer to FIG. 1 and FIG. 2, wherein FIG. 1 is a schematic view illustrating a conventional wave power generator; FIG. 2 is another schematic view illustrating the conventional wave power generator. The conventional wave power generator is to dispose an air turbine (1a) at a seashore (rock shore or sand shore), a wave (2a) is utilized to drive the airflow inside an air tube (3a) thereby enabling the airflow to drive the air turbine (1a) to generate power; however, the above-mentioned method is to utilize water to push air for generating electric power, the obtained energy may be reduced because of the smaller air density, so the energy conversion efficiency is poor.

Accordingly, the applicant of the present invention has devoted himself for researching and inventing a novel design for improving the above-mentioned disadvantages.

SUMMARY OF THE INVENTION

The present invention is to provide a power generating device utilizing oscillating water for converting into wave power, wherein gas is utilized for driving water so as to drive a driving member thereby generating electric energy.

The present invention is to provide a power generating device utilizing oscillating water for converting into wave power, wherein a better power generating efficiency is provided.

Accordingly, the present invention provides a power generating device utilizing oscillating water for converting into wave power, which includes a power generating tank, a quantitative liquid, a resonating member, a quantitative gas and a driving member; the power generating tank is formed with a first chamber and a second chamber, and a communicating hole is formed between the first chamber and the second chamber; the quantitative liquid is filled in the first chamber and the second chamber; one end of the resonating member is communicated with the first chamber and the other end thereof is disposed in a wave, and the wave is allowed to flow into the resonating member; the quantitative gas is filled between the liquid surface of the quantitative liquid in the first chamber and the liquid surface of the wave in the resonating member; the driving member is pushed by the quantitative liquid; wherein when the wave flows towards the inward direction of the first chamber, the gas pressure inside the first chamber is higher than the gas pressure inside the second chamber thereby driving the quantitative liquid to flow from the first chamber to the second chamber and pass the communicating hole so as to drive the driving member; when the wave flows towards the outward direction of the first chamber, the gas pressure inside the first chamber is lower than the gas pressure inside the second chamber thereby driving the quantitative liquid to flow from the second chamber to the first chamber and pass the communicating hole so as to drive the driving member.

Accordingly, the present invention provides a power generating device utilizing oscillating water for converting into wave power, which includes a power generating tank, a quantitative liquid, a resonating member, a quantitative gas, a driving member and a power generating motor; the power generating tank is formed with a first chamber, a second chamber and a communicating hole, and the communicating hole is served to communicate the first chamber and the second chamber; the quantitative liquid is filled between the first chamber and the second chamber through the communicating hole; one end of the resonating member is communicated with the first chamber and the other end thereof is disposed in a wave, and the wave is allowed to flow into the resonating member; the quantitative gas is filled between the quantitative liquid in the first chamber and the wave in the resonating member; the driving member is pushed by the quantitative liquid; the power generating motor is driven by the driving member for generating electric power so as to be outputted; wherein during the reciprocal movement of the wave, the quantitative gas is pushed and squeezed thereby enabling the quantitative liquid to push the driving member, and the driving member drives the power generating motor for generating electric power so as to be outputted.

In comparison with related art, the power generating device utilizing oscillating water for converting into wave power provided by the present invention utilizes the reciprocally-moving wave to push and squeeze the gas in a sealed space (the first chamber); after the gas is pushed and squeezed, the pressure inside the sealed space is raised thereby enabling the quantitative liquid to be displaced for being moved between the two chambers, so the driving member installed between the two chambers is pushed thereby achieving an objective of generating electric power and increasing the power generating efficiency.

DETAILED DESCRIPTION OF THE INVENTION

Preferred embodiments of the present invention will be described with reference to the drawings.

Figure 3:
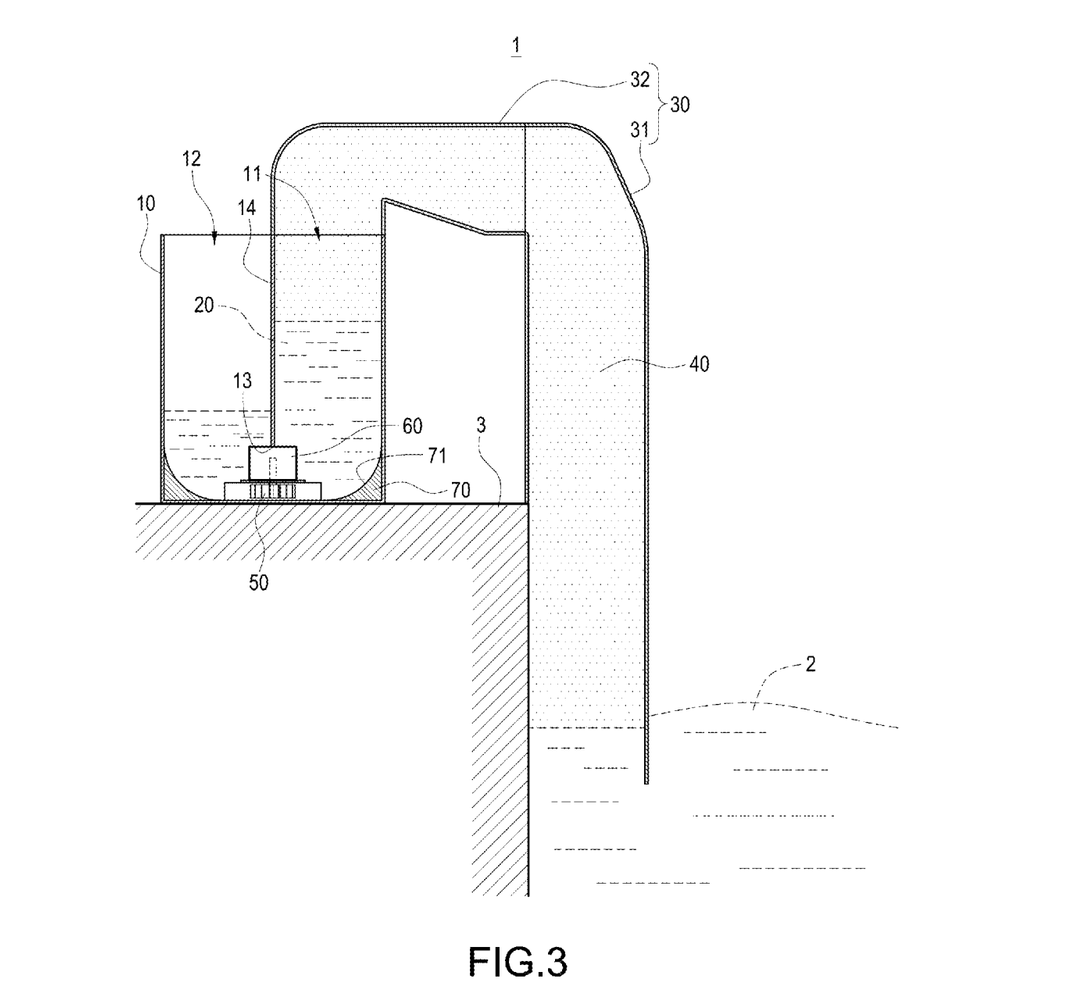
FIG. 3 is a plane view illustrating the power generating device utilizing oscillating water for converting into wave power according a first embodiment of the present invention.

Please refer to FIG. 3, which is a plane view illustrating the power generating device utilizing oscillating water for converting into wave power according a first embodiment of the present invention. The present invention provides a power generating device utilizing oscillating water for converting into wave power (1), which includes a power generating tank (10), a quantitative liquid (20), a resonating member (30), a quantitative gas (40) and a driving member (50). The quantitative liquid (20), the quantitative gas (40) and the driving member (50) are accommodated in the power generating tank (10), and the resonating member (30) is used for connecting the power generating tank (10) and a wave (2).

The power generating tank (10) is formed with a first chamber (11) and a second chamber (12), and a communicating hole (13) is formed between the first chamber (11) and the second chamber (12), the installation of the communicating hole (13) is to allow the first chamber (11) to be communicated with the second chamber (12). Preferably, the power generating tank (10) further includes a partition plate (14), the interior of the power generating tank (10) is partitioned by the partition plate (14) for forming the first chamber (11) and the second chamber (12), and the communicating hole (13) is formed at the bottom of the partition plate (14).

The quantitative liquid (20) is filled in the first chamber (11) and the second chamber (12). In actual practice, the quantitative liquid (20) is filled between the first chamber (11) and the second chamber (12) through the communicating hole (13), and the quantitative liquid (20) is water or other working fluid.

One end of the resonating member (30) is communicated with the first chamber (11), the other end thereof is disposed in the wave (2), and the wave (2) is allowed to flow into the resonating member (30). According to the first embodiment of the present invention, the resonating member (30) includes a resonating case (31) disposed in the wave (2) and a connecting pipe (32) for connecting the first chamber (11) and the resonating case (31).

The quantitative gas (40) is filled between the liquid surface of the quantitative liquid (20) in the first chamber (11) and the liquid surface of the wave (2) in the resonating member (30). Preferably, the quantitative gas (40) is air or other working gas.

According to the first embodiment, the driving member (50) is a hydraulic turbine, e.g. a centrifugal turbine, and the hydraulic turbine is installed corresponding to the communicating hole (13). In addition, the power generating device (1) further includes a power generating motor (60). The power generating motor (60) is driven by the driving member (50) for generating electric power so as to be outputted. According to the first embodiment, the power generating motor (60) is installed on the driving member (50).

Moreover, according to the first embodiment of the present invention, the power generating device (1) further includes a plurality of flow guiding blocks (70). The flow guiding blocks (70) are disposed at corners of the first chamber (11) and at corners of the second chamber (12), and each of the flow guiding blocks (70) is formed with an arc-shaped flow guiding surface (71).

Figure 4:
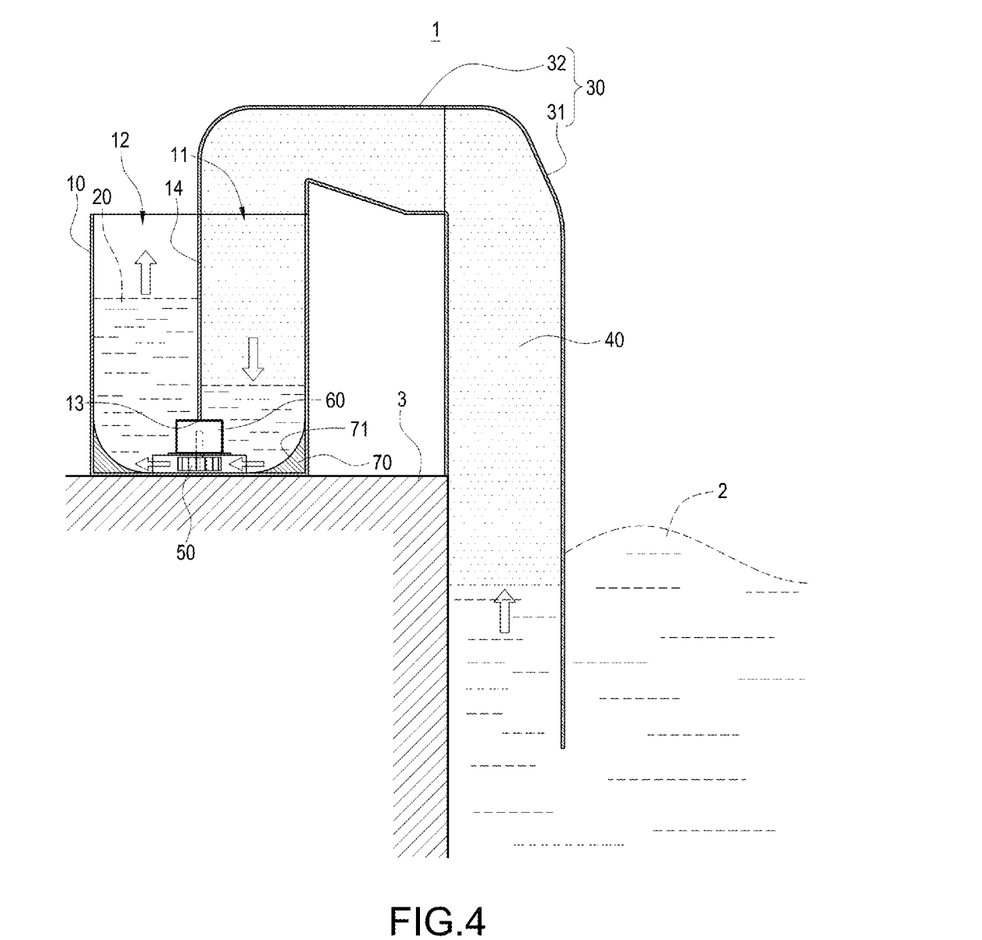
FIG. 4 is a schematic view illustrating the operation of the power generating device utilizing oscillating water for converting into wave power according the first embodiment of the present invention.
Figure 5:
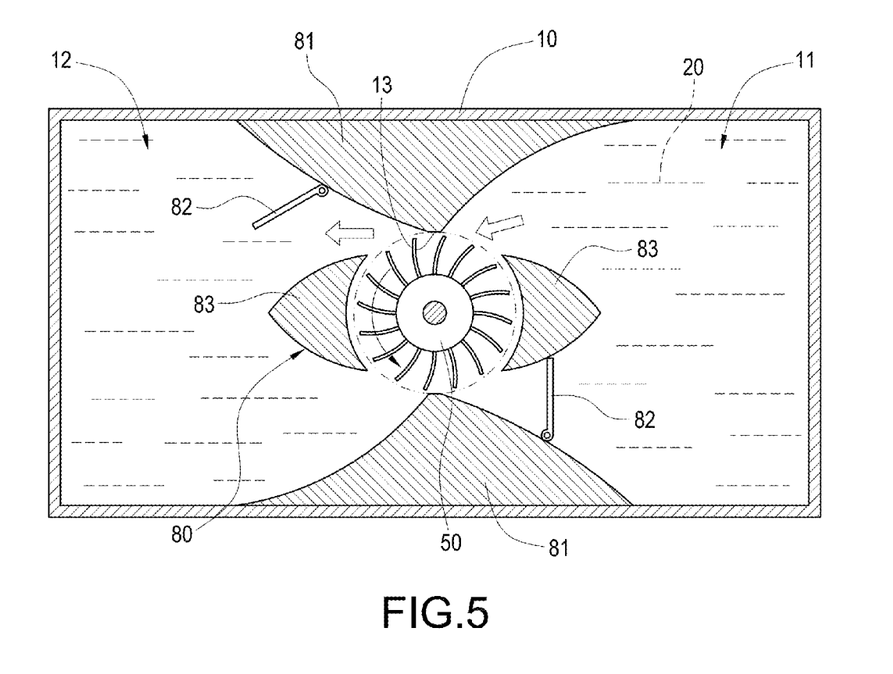
FIG. 5 is a schematic view illustrating the water flowing status in the power generating device utilizing oscillating water for converting into wave power according to the first embodiment of the present invention.

Please refer to FIG. 4 and FIG. 5, wherein FIG. 4 is a schematic view illustrating the operation of the power generating device utilizing oscillating water for converting into wave power according the first embodiment of the present invention; and FIG. 5 is a schematic view illustrating the water flowing status in the power generating device utilizing oscillating water for converting into wave power according to the first embodiment of the present invention. When the power generating device (1) provided by the present invention is in use, the power generating device (1) can be installed at a seashore (3). When the seawater flows toward the seashore (3), a part of the wave (2) is allowed to flow into the resonating case (31) of the resonating member (30). At this moment, the wave (2) is moved towards the inward direction of the first chamber (11), the gas pressure inside the first chamber (11) is higher than the gas pressure inside the second chamber (12) thereby driving the quantitative liquid (20) to flow from the first chamber (11) to the second chamber (12), and the wave (2) flowing towards the second chamber (12) is enabled to pass the communicating hole (13) thereby driving the driving member (50) to rotate towards one direction (counterclockwise according to this embodiment).

Please refer to FIG. 5, the power generating device (1) provided by the present invention further includes a flow introducing structure (80), and the flow introducing structure (80) is installed corresponding to the driving member (50). According to the first embodiment of the present invention, the flow introducing structure (80) includes two flow introducing blocks (81), two check valves (82) and two flow distributing blocks (83). Each of the flow introducing blocks (81) is corresponding to the communicating hole (13) thereby being disposed at the bottom of the power generating tank (10). Each of the flow distributing blocks (83) is disposed at two opposite sides of the driving member (50).

One end of each of the check valves (82) is pivoted with the flow introducing block (83), the other end thereof is linked with the flowing direction of the quantitative liquid (20) so as to be intermittently opened or closed.

Figure 6:
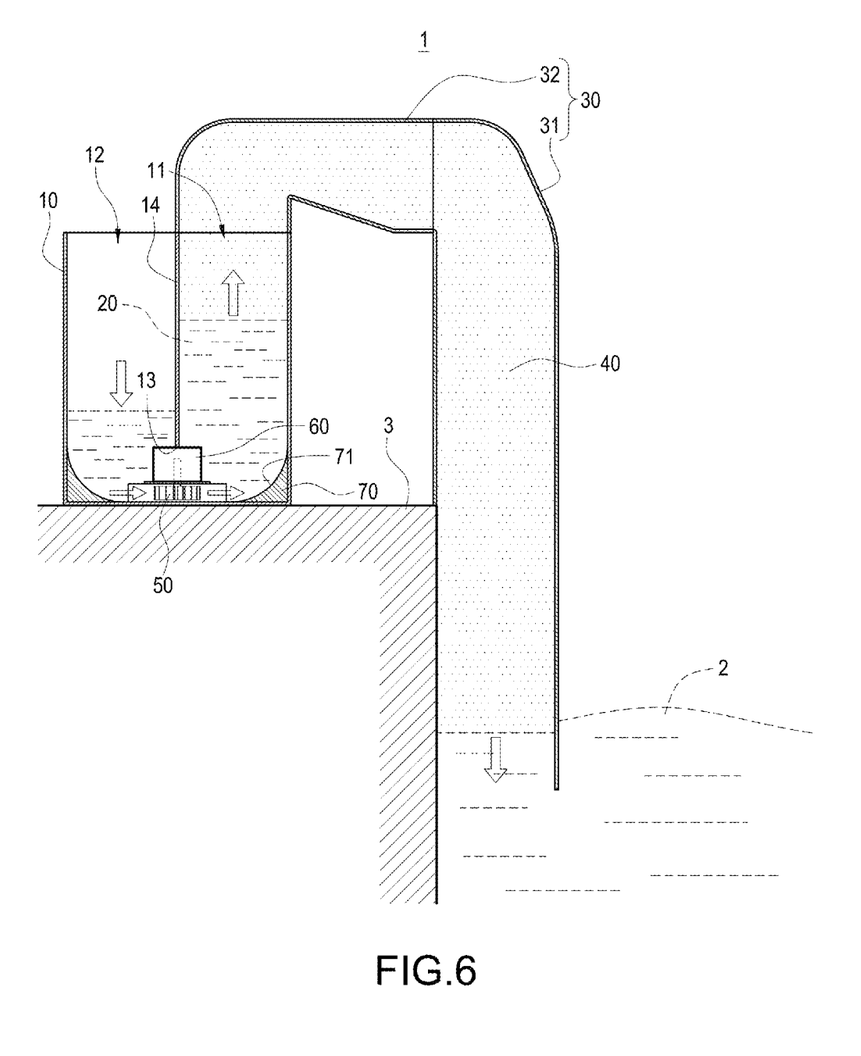
FIG. 6 is another schematic view illustrating the operation of the power generating device utilizing oscillating water for converting into wave power according to the first embodiment of the present invention.
Figure 7:
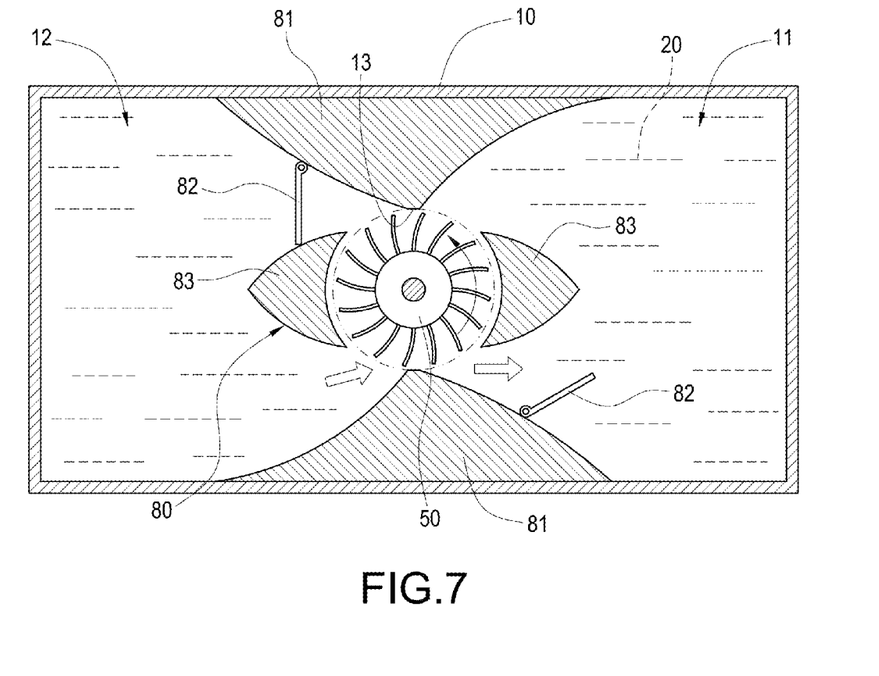
FIG. 7 is another schematic view illustrating the water flowing status of the power generating device utilizing oscillating water for converting into wave power according to the first embodiment of the present invention.

Please refer to FIG. 6 and FIG. 7, wherein FIG. 6 is another schematic view illustrating the operation of the power generating device utilizing oscillating water for converting into wave power according to the first embodiment of the present invention; and FIG. 7 is another schematic view illustrating the water flowing status of the power generating device utilizing oscillating water for converting into wave power according to the first embodiment of the present invention. When the seawater flows away from the seashore (3), the wave inside the resonating case (31) flows towards the outward direction of the first chamber (11), at this moment the gas pressure inside the first chamber (11) is lower than the gas pressure inside the second chamber (12) thereby driving the quantitative liquid (20) to flow from the second chamber (12) to the first chamber (11), and the wave (2) flowing towards the first chamber (11) is enabled to pass the communicating hole (13) thereby driving the driving member (50) to continuously rotate towards the same direction (counterclockwise according to this embodiment).

Accordingly, during the reciprocal movement of the wave (2), the quantitative gas (40) inside the resonating case (31) is pushed and squeezed thereby enabling the quantitative liquid (20) to push the driving member (50), and the driving member (50) drives the power generating motor (60) to rotate so as to achieve the objective of generating electric power through the wave.

Figure 8:
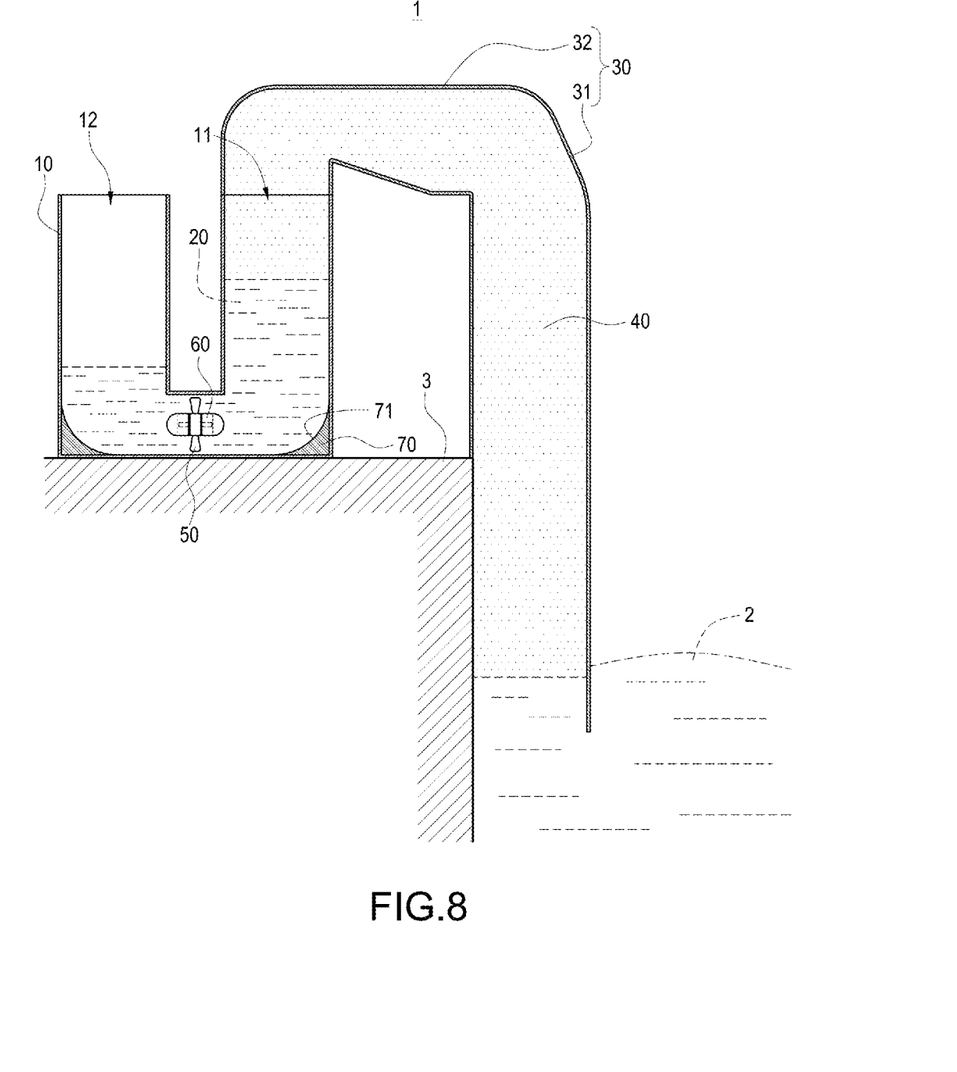
FIG. 8 is a schematic view illustrating the power generating device utilizing oscillating water for converting into wave power according to an alternative of the first embodiment of the present invention.

Please refer to FIG. 8, which is a schematic view illustrating the power generating device utilizing oscillating water for converting into wave power according to an alternative of the first embodiment of the present invention. As shown in FIG. 8, the driving member (50) is an axial turbine. The technical feature of the axial turbine is that the blades thereof are able to constantly rotate towards the same direction without being interfered by the water flowing direction.

Figure 9:
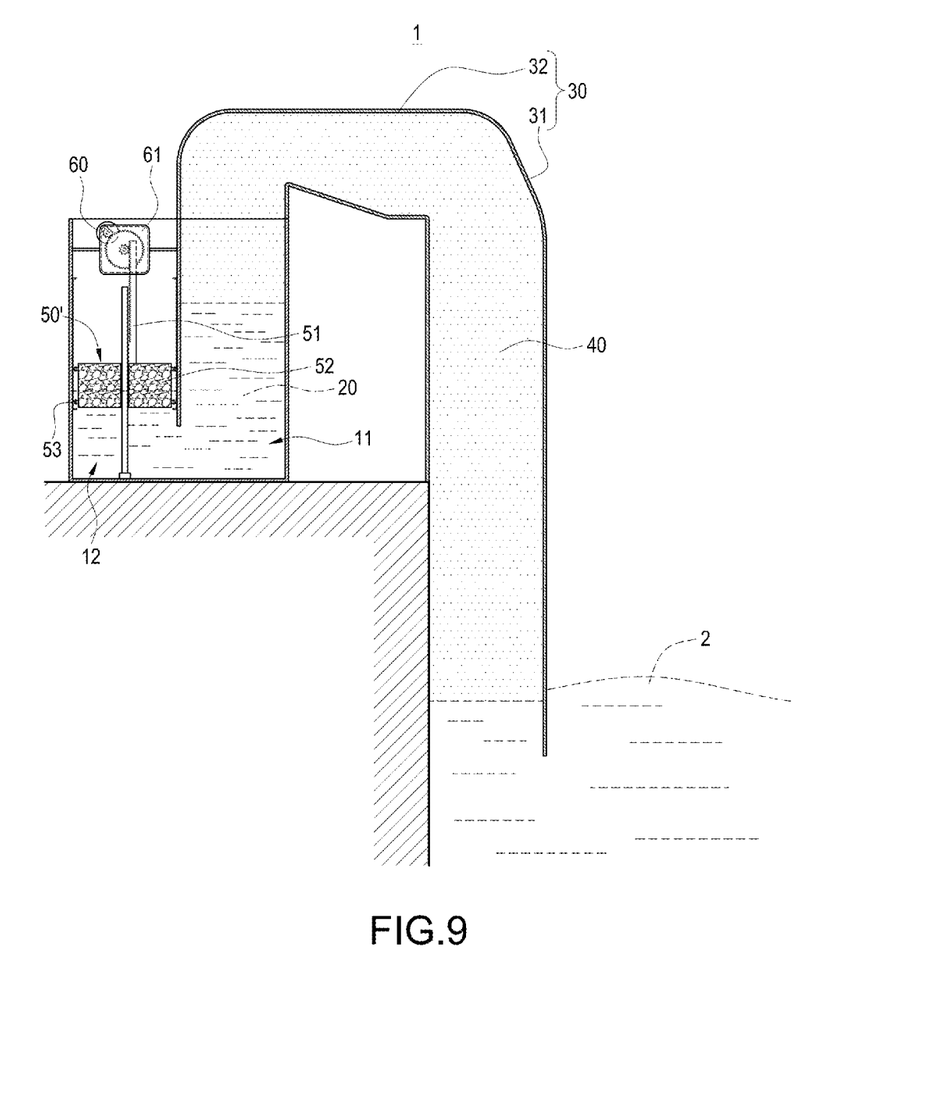
FIG. 9 is a schematic view illustrating the power generating device utilizing oscillating water for converting into wave power according a second embodiment of the present invention.
Figure 10:
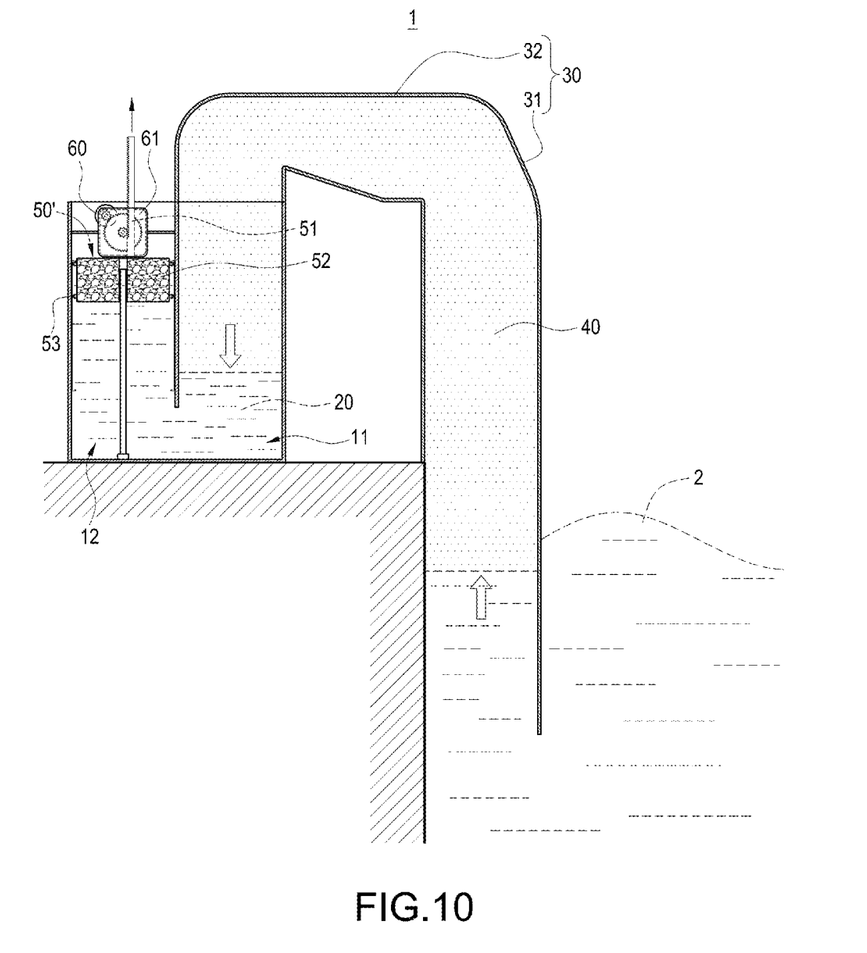
FIG. 10 is a schematic view illustrating the operation of the power generating device utilizing oscillating water for converting into wave power according the second embodiment of the present invention.

Please refer to FIG. 9 and FIG. 10, wherein FIG. 9 is a schematic view illustrating the power generating device utilizing oscillating water for converting into wave power according a second embodiment of the present invention; and FIG. 10 is a schematic view illustrating the operation of the power generating device utilizing oscillating water for converting into wave power according the second embodiment of the present invention. The difference between this second embodiment and the first embodiment is that a driving member (50') is disposed in the second chamber (12), and the driving member (50') is a buoy (52) having a gear rack (51). Through a plurality of rollers (53), the gear rack (51) is able to guide the buoy (52) thereby enabling the buoy (52) to be upwardly/downwardly moved with the quantitative liquid (20) along the inner wall of the second chamber (12). In addition, the power generating motor (60) further includes a gear box (61) driven by the gear rack (51).

When the wave (2) flows towards the inward direction of the first chamber (11), the quantitative gas (40) drives the quantitative liquid (20) to be upwardly moved, and the buoy (52) is driven by the quantitative liquid (20) to be upwardly moved along the inner wall of the second chamber (12), at this moment the upward-moving gear rack (51) drives the gear box (61) to operate, then the gear box (61) further drives the power generating motor (60) to generate electric power so as to be outputted; on the other hand, when the wave (2) flows towards the outward direction of the first chamber (11), the quantitative liquid (20) is downwardly moved, at this moment the buoy (52) takes advantage of its self-weight for being downwardly moved along the inner wall of the second chamber (12); accordingly, the driving member (50') is pushed by the quantitative liquid (20) for performing the reciprocal movement thereby driving the power generating motor (60) to generate electric power.

Figure 11:
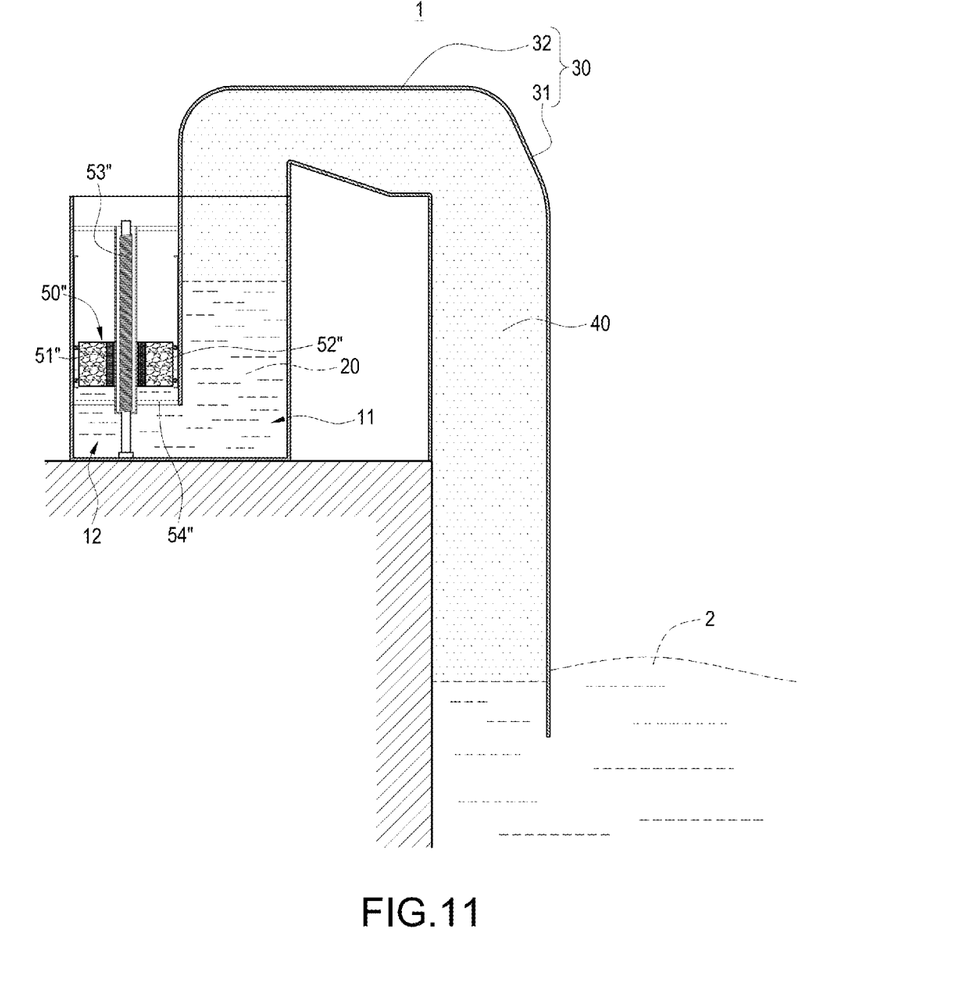
FIG. 11 is a schematic view illustrating the power generating device utilizing oscillating water for converting into wave power according a third embodiment of the present invention.

Please refer to FIG. 11, which is a schematic view illustrating the power generating device utilizing oscillating water for converting into wave power according a third embodiment of the present invention. This embodiment is substantially the same as the previous embodiment, but the difference is the driving member. According to the third embodiment, a driving member (50") is a buoy (52") having a mobile coil (51"). The buoy (52") is upwardly/downwardly moved with the quantitative liquid (20) along the inner wall of the second chamber (12). In addition, the driving member (50") further includes a fixed coil (53") disposed in the second chamber (12) and fastened by a supporter (54"). In actual practice, the mobile coil (51") forms a relative movement with the fixed coil (53") through the upward/downward movement of the buoy (52"), the above-mentioned relative movement is able to cut magnetic fields thereby generating electric power.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power generating device utilizing oscillating water for converting wave power (1), including:
   a power generating tank (10), formed with a first chamber (11) and a second chamber (12), wherein a communicating hole (13) is formed between the first chamber (11) and the second chamber (12);
   a quantitative liquid (20), filled in the first chamber (11) and the second chamber (12);
   a resonating member (30), having one end communicated with the first chamber (11) and the other end disposed in a wave (2), wherein the wave (2) is allowed to flow into the resonating member (30);
   a quantitative gas (40), filled between the liquid surface of the quantitative liquid (20) in the first chamber (11) and the liquid surface of the wave (2) in the resonating member (30); and
   a driving member (50, 50', 50"), pushed by the quantitative liquid (20);
   wherein, when the wave (2) flows towards an inward direction of the first chamber (11), a gas pressure inside the first chamber (11) is higher than a gas pressure inside the second chamber (12) thereby driving the quantitative liquid (20) to flow from the first chamber (11) to the second chamber (12) and pass the communicating hole (13) so as to drive the driving member (50, 50', 50"); when the wave (2) flows towards an outward direction of the first chamber (11), the gas pressure inside the first chamber (11) is lower than the gas pressure inside the second chamber (12) thereby driving the quantitative liquid (20) to flow from the second chamber (12) to the first chamber (11) and pass the communicating hole (13) so as to drive the driving member (50, 50', 50");
   wherein the power generating tank (10) further includes a partition plate (14), the interior of the power generating tank (10) is partitioned by the partition plate (14) for forming the first chamber (11) and the second chamber (12), and the communicating hole (13) is formed at the bottom of the partition plate (14).

2. The power generating device utilizing oscillating water for converting wave power (1) according to claim 1, further including a power generating motor (60), wherein the power generating motor (60) is driven by the driving member (50, 50', 50") for generating electric power so as to be outputted.

3. The power generating device utilizing oscillating water for converting wave power (1) according to claim 1, wherein the driving member (50, 50', 50") is a hydraulic turbine, and the hydraulic turbine is installed corresponding to the communicating hole (13).

4. The power generating device utilizing oscillating water for converting wave power (1) according to claim 1, wherein the driving member (50') is disposed in the second chamber (12), and the driving member (50') is a buoy (52) having a gear rack (51), and the power generating motor (60) further includes a gear box (61) driven by the gear rack (51).

5. The power generating device utilizing oscillating water for converting wave power (1) according to claim 1, wherein the driving member (50") is disposed in the second chamber (12), and the driving member (50") is a buoy (52") having a mobile coil (51"), and a fixed coil (53") is further provided.

6. The power generating device utilizing oscillating water for converting wave power (1) according to claim 1, wherein the resonating member (30) includes a resonating case (31) disposed in the wave (2) and a connecting pipe (32) for connecting the first chamber (11) and the resonating case (31).

7. The power generating device utilizing oscillating water for converting wave power (1) according to claim 1, further including a plurality of flow guiding blocks (70), wherein the flow guiding blocks (70) are disposed at corners of the first chamber (11) and at corners of the second chamber (12), and each of the flow guiding blocks (70) is formed with an arc-shaped flow guiding surface (71).

8. The power generating device utilizing oscillating water for converting wave power (1) according to claim 1, further including a flow introducing structure (80), wherein the flow introducing structure (80) is installed corresponding to the driving member (50, 50', 50").

9. The power generating device utilizing oscillating water for converting wave power (1) according to claim 8, wherein the flow introducing structure (80) includes two flow introducing blocks (81), two check valves (82) and two flow distributing blocks (83), each of the flow introducing blocks (81) is corresponding to the communicating hole (13) thereby being disposed at the bottom of the power generating tank (10), each of the flow distributing blocks (83) is disposed at two opposite sides of the driving member (50, 50', 50"), one end of each of the check valves (82) is pivoted with the flow introducing block (83), and the other end thereof is linked with the flowing direction of the quantitative liquid (20) so as to be intermittently opened or closed.

\* \* \* \* \*